Sept. 6, 1955 B. KAZAN 2,717,328
PULSED HIGH VOLTAGE DIRECT CURRENT POWER SOURCE
Filed Aug. 4, 1952
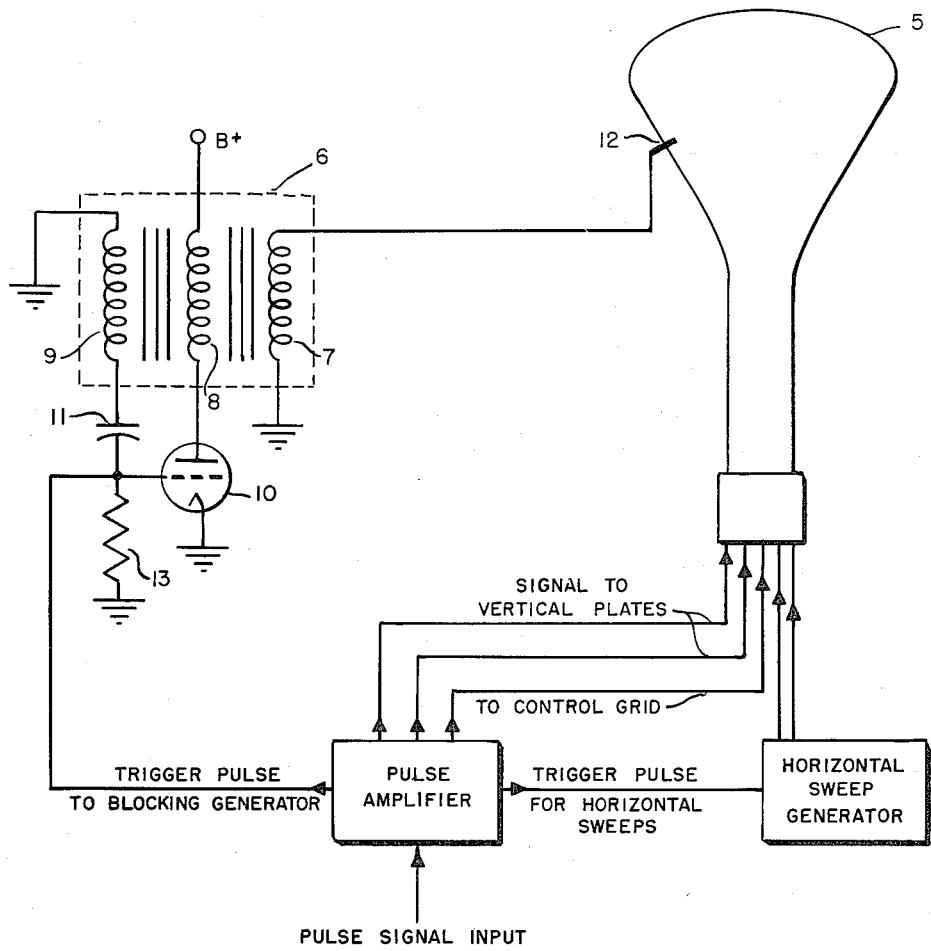
INVENTOR.
BENJAMIN KAZAN
BY Lawrence Glassman 2,717,328

PULSED HIGH VOLTAGE DIRECT CURRENT POWER SOURCE

Benjamin Kazan, Princeton, N. J., assignor to the United States of America as represented by the Secretary of the Army Application August 4, 1952, Serial No. 302,635

5 Claims. (Cl. 315—14)

(Granted under Title 35, U. S. Code (1952), sec. 266)

The invention described herein may be manufactured and used by or for the Government for governmental purposes, without the payment of any royalty thereon.

This invention relates to a means for developing high voltage direct current power in pulsed form such power being made available at intervals which may be synchronized with other pulsed power quantities.

Among other applications of the invention a very useful one is its application to the operation of a cathode ray tube, and particularly to such a tube when operated as a synchroscope.

In its general application the invention provides a very efficient means to be substituted for a constantly maintained high voltage direct current power source and may be so used where the load device requires only intermittent pulsed units of power, the timing of which is under the control of other circuit elements.

The high voltage pulses are obtained from a special winding upon a transformer which is incorporated in a blocking oscillator circuit including a biased tube. When the grid of this tube is triggered to the point of actuation of the circuit, the pulsing power developed in the transformer induces a high voltage in this special high voltage winding and the power therefrom is applied to the load.

A trigger means which may be conventional is arranged to apply its output to the grid of the tube in the blocking oscillator and simultaneously to an element in the load which is closely related to the timing cycle thereof, such as a control grid in a thermionic device.

It is therefore possible to develop an apparatus having a working cycle which doesn't require a constantly maintained high voltage direct current source nor a blanking circuit. A more detailed description of the invention will appear hereinafter.

It is a primary object of the invention to provide a controlled intermittent source of power by means of a pulsing device.

It is a further object of the invention to provide a pulsed source of power the timing of which is synchronized to the operating cycle of the device utilizing the power.

A further object of the invention is to provide an intermittent source of power which is generated only during periods of time when power is required by the load and consequently requires no controlling means such as a blanking voltage circuit.

A further object of the invention is to provide a source of direct current power for the high voltage anode of a device in the class of cathode ray indicators wherein the tube is operated without a conventional high voltage direct current supply.

A further object of the invention is to provide a source of direct current power for the high voltage anode of a device in the class of cathode ray indicators wherein no blanking voltage is required to separate the operating cycles of the device.

A still further object of the invention is to provide an efficient and simplified synchroscope or like device using a minimum of elements.

Other objects and features of the invention will more fully appear from the following description and will be particularly pointed out in the claims.

To provide a better understanding of the invention a particular embodiment thereof will be described in connection with the accompanying drawing:

The drawing illustrates diagrammatically an apparatus embodying the invention wherein a conventional cathode ray tube 5 is supplied in the usual way with power for supplying its cathode and sweep circuit elements from suitable sources as indicated by block diagram in Figure 1. Aside from its grid circuit the tube must also be supplied with high voltage anode power. This power is supplied in a novel manner and constitutes a feature of the invention.

The high voltage anode power is supplied by a special form of pulse transformer 6 used in a blocking oscillator circuit. This circuit is triggered by a trigger pulse the form of which is to be observed on the cathode ray tube.

The transformer is provided with a winding 7 in addition to its conventional windings 8 and 9. The winding 9 is connected to the grid of the tube 10 of the blocking oscillator circuit. A tank condenser 11 is inserted in the grid circuit. The other end of winding 9 is grounded. The winding 8 is connected at one end to a direct current power supply while the other end thereof is connected to the plate of the tube 10. The windings 8 and 9 and their connected elements are designed to function as a conventional blocking oscillator.

The additional winding 7 is closely coupled to the other elements of the transformer and desirably wound upon the same core system. This winding should contain a relatively high ratio of turns. The high voltage end of the coil is connected to the high voltage anode 12 of the tube 5. It is also highly desirable that the blocking oscillator be designed to produce a square wave for reasons to be pointed out hereinafter.

It is obvious that when the blocking oscillator is triggered a relatively high voltage pulse is generated in the winding 7. The peak voltage of the pulse is utilized to supply the high voltage anode with power for the tube 5.

The grid of the tube 10 desirably is connected to ground thru a resistor 13 and the cathode thereof is connected to ground. Suitable cathode heating current is supplied to the tube 10 in the conventional or any suitable manner.

In operation, a trigger pulse is applied to the control grid of the tube 5 and also to the grid of the tube 10 as indicated by block diagram. By so doing the blocking oscillator is triggered which causes the high voltage pulse from the winding 7 to energize the high voltage anode 12 of the tube 5 during the time period of its peak voltage and during the period of sweep of the electron beam. It will be understood that the pulse delivered by the winding 7 should be a square pulse thereby to insure that maximum voltage will instantly be applied to the cathode and will remain constant for at least the period of a single sweep of the electron beam.

Thus the characteristics of the trigger pulse may be observed on the face of the tube 5. Repetition frequency of the cycle being limited only by the recovery rate of the blocking oscillator device.

The tube 5 is or may be of conventional construction having the usual external connections as indicated on the drawing in connection with the block diagrams indicating the pulse amplifier and the horizontal sweep generator.

The pulse signal to be studied is fed first to the pulse amplifier from where a trigger pulse is fed to the grid of the tube 10 and also to the control grid of the tube 5.

To maintain properly synchronized operation of the tube the pulse amplifier also feeds a signal to the vertical deflection plates and to the horizontal sweep circuit generator which in turn feeds the horizontal sweep circuit of the tube.

While a particular circuit arrangement has been described other circuit arrangements and elements may be employed in the practice of the invention within the spirit and scope of the claims.

It may be desirable to so design the blocking oscillator that the duration of its output pulse be slightly greater than the sweep period. In this manner slight phase differences or distortion of pulse shaping may be overcome.

In the event that in a given apparatus there is excessive capacity between the high voltage anode and ground certain precautions may be used to prevent a small time lag between energizing the screen of the tube 5 and the start of the sweep cycle. This condition may be overcome by inserting a phase delay in such a manner that the trigger pulse will start the operation of the blocking oscillator a short time before the start of the sweep.

While there has been described what is at present considered to be the preferred embodiment of this invention, it will be obvious to those skilled in the art that various changes and modifications may be made therein without departing from the invention, and it is, therefore aimed in the appended claims to cover all such changes and modifications as fall within the true spirit and scope of the invention.

What is claimed is:

1. A high voltage direct current power supply for an electronically controlled load, comprising a blocking oscillator having a transformer and a grid controlled tube in its circuit, an additional high voltage winding on said transformer connected to intermittently apply the high voltage induced therein to said load, additional grid controlled power supply means across said load, trigger pulsing means and connections to apply the output thereof to trigger said blocking oscillator and the additional power supply means simultaneously.

2. A high voltage intermittent direct current power supply for the anode circuit of a trigger controlled electronic device, comprising a blocking oscillator having a transformer and a grid controlled tube in its circuit, an additional winding on said transformer having a high voltage output connected to apply its voltage to said anode and trigger pulsing means having connections to apply its output to the grid of said blocking oscillator tube and to trigger the means for energizing other elements of said electronic device simultaneously.

3. A high voltage intermittent direct current power supply for the anode circuit of a triggered grid controlled electronic load device, comprising a wave pulsing means of the blocking oscillator type including an operating tube having a grid normally biased to cut off and a transformer having a high voltage winding energized by the pulsing power from the said transformer and whose output is a square wave pulse said winding being connected to the anode circuit of said load device and trigger pulsing means having connections to apply its output to simultaneously trigger the blocking oscillator and the energization of the other elements of the device.

4. A pulsed high voltage direct current power supply for the anode circuit of a trigger controlled electronic load device having an anode, comprising a pulsing means of the blocking oscillator type including a grid controlled tube and a transformer having three inductively coupled windings, one winding being connected to the grid of said tube, a second winding connected to the anode thereof and a third high voltage winding having a square wave output connected to the anode of the load device and trigger pulsing means having connections for applying its output to said load controlling means and to trigger said pulsing means simultaneously.

5. A pulsed high voltage direct current power supply for the high voltage anode of a cathode ray tube having a control grid, comprising a wave pulsing means of the blocking oscillator type including a grid controlled tube and a three winding transformer, one of said windings having a square wave output and being connected to the high voltage anode of said cathode ray tube and trigger means having connections for applying its output to synchronize the application of beam sweep power to said cathode ray tube with the energization of its high voltage anode.

References Cited in the file of this patent

UNITED STATES PATENTS

| | | |
|---|---|---|
| 2,133,138 | Hamacher | Oct. 11, 1938 |
| 2,218,764 | Moller | Oct. 22, 1940 |
| 2,265,620 | Bahring | Dec. 9, 1941 |
| 2,302,876 | Malling | Nov. 24, 1942 |
| 2,458,532 | Schlesinger | Jan. 11, 1949 |
| 2,523,108 | Friend | Sept. 19, 1950 |
| 2,577,112 | Duke | Dec. 4, 1951 |